2,859,250

SYNTHETIC NON-IONIC DETERGENTS FROM 2,2-BIS (4-HYDROXY-PHENYL) PROPANE

Joseph E. Woodbridge, Rutledge, and Vincent J. Keenan, Ardmore, Pa., assignors to The Atlantic Refining Company, Philadelphia, Pa., a corporation of Pennsylvania No Drawing. Application January 16, 1957
Serial No. 634,402

3 Claims. (Cl. 260—613)

This invention relates to a new class of low-foaming synthetic non-ionic detergents and method for their preparation. More particularly, this invention relates to novel synthetic non-ionic detergents obtained by reacting ethylene oxide with bis(4-hydroxyphenyl) alkanes at relatively high temperatures in the presence of an alkaline catalyst.

Ethylene oxide condensate type non-ionic synthetic detergents are generally known to possess high detergency-low foam characteristics which make them particularly suitable for home laundry and dishwashing machines, as well as for many industrial purposes. In these condensation reactions relatively low temperatures of the order of 100° C. to 170° C. are employed. It was found, however, that when bis(4-hydroxyphenyl) alkanes are condensed with ethylene oxide in the presence of an alkaline catalyst at these relatively low temperatures taught by the prior art for ethylene oxide condensation reactions, the products obtained do not possess high detergency characteristics. The surprising discovery has now been made that if ethylene oxide is reacted with a bis(4-hydroxyphenyl) alkane in the presence of an alkaline catalyst at elevated temperatures, i. e. between 210° C. and 270° C. and preferably between 225° C. and 260° C., novel detergents possessing unexpectedly high detergency properties are obtained.

The reaction products obtained at these high temperatures are not identifiable by any of the known old or modern analytical techniques. Efforts to identify the structure of the products by infra red and ultra-violet means have been unavailing. The infra red and ultra-violet patterns obtained on products resulting from high reaction temperatures, i. e. above about 210° C., differ from the patterns obtained on the identifiable condensation products resulting from those at low reaction temperatures. It was theorized that at the high temperatures employed in the instant invention the condensate molecule splits. For example, in reacting 2,2-bis(4-hydroxyphenyl) propane with ethylene oxide it was theorized that the condensate molecule splits into a phenol-ethylene oxide portion and an isopropyl phenol-ethylene oxide portion. These groups, however, were not identifiable by infra red or ultra-violet methods. Accordingly these components were prepared separately by condensing phenol with ethylene oxide and by condensing isopropyl phenol with ethylene oxide and their detergency measured. Each of the separate components exhibited low detergency characteristics. Moreover, when these separate theoretical components were combined the composite did not evidence high detergency characteristics as do the products of the instant invention. Thus, with the present methods of analysis it is neither possible to show that the reaction products are decomposition products nor is it possible to identify the reaction products.

It should be pointed out that the process of the instant invention and the products obtained thereby are not to be limited by any theoretical concept, or lack of such, as to the reaction or reactions involved, nor by the unsusceptibility of the product to identification of structure.

Regardless of the theory of the reactions involved, it has been found that when a bis(4-hydroxyphenyl) alkane is reacted with ethylene oxide at temperatures between 210° C. and 270° C., a new class of synthetic non-ionic detergents is formed which exhibits superior high detergency and low foam characteristics.

It is therefore an object of this inveniton to produce non-ionic synthetic detergents having superior detergency properties.

It is another object of this invention to produce non-ionic synthetic detergents having very low foam characteristics.

Other objects and advantages will become apparent from the following description of the invention in the specification and from the appended claims.

In accordance with the present invention a bis(4-hydroxyphenyl) alkane is reacted with ethylene oxide in the presence of from about 1 percent to about 9 percent of an alkaline catalyst, at a temperature of from 210° C. to 270° C., until the mole ratio of ethylene oxide to said bis(4-hydroxyphenyl) alkane is from about 7:1 to about 20:1, and preferably from about 10:1 to about 15:1. Although temperatures of the reaction may range between 210° C. and 270° C., it is preferable to carry out the reaction at temperatures of from 225° C. to 260° C. The bis(4-hydroxyphenyl) alkane and the catalyst are placed in a glass apparatus, or other suitable apparatus, and the mixture is heated to 210° C. to 270° C. The passage of ethylene oxide through a disperser, such as a sintered glass disc, is begun. The reaction is exothermic and heating is controlled so as to maintain the temperature in the desired range. Ethylene oxide addition is continued until the preferred number of equivalents, as determined by weight, have been added. Products obtained by reacting 2,2-bis (4-hydroxyphenyl) propane, for example with ethylene oxide, exhibit superior high detergency and low foam characteristics.

The catalyst used may be any alkaline catalyst of those known to the art which promote the reaction of ethylene oxide with a phenol, such as sodium hydroxide, potassium hydroxide, potassium carbonate, sodium carbonate, sodium tripolyphosphate, or a mixture of alkaline catalysts, such as sodium hydroxide and sodium glycerophosphate. The alkali metal hydroxides and potassium carbonate are preferred. The catalyst may be added in an aqueous solution or in solid form, but it is preferred to utilize solid catalysts. About 1 weight percent to about 9 weight percent of the catalyst, based on the bis(4-hydroxyphenyl) alkane, may be used, 1 weight percent to 4 weight percent being preferred.

The bis(4-hydroxyphenyl) alkanes which are reacted with ethylene oxide to form the non-ionic detergents of the instant invention have the general formula:

wherein R represents an alkylidene radical having from 1 to 5 carbon atoms. They may be obtained commercially or may be prepared by known methods, for example, by condensing an aldehyde or a ketone with a monohydric phenol of the benzene series. 2,2-bis(4-hydroxyphenyl) propane and 2,2-bis(4-hydroxyphenyl) butane, for example, are marketed by the Dow Chemical Company as Bisphenol "A" and Bisphenol "B" respectively. As a further example, Bisphenol "A" may also be prepared by condensing phenol with acetone in the presence of HCl as described in Beilstein, Band VI, Syst. No. 563, page 1011, 4 Ed., Springer, Berlin (1923). Examples of some of the bis(4-hydroxyphenyl) alkanes which may be used in the instant invention are: bis(4-hydroxyphenyl) methane, 1,1-bis(4-hydroxyphenyl) ethane, 1,1-bis(4-hydroxyphenyl) propane, 1,1-bis(4-hydroxyphenyl) butane, 1,1-bis(4-hydroxyphenyl) isobutane, 1,1-bis(4-hydroxyphenyl) pentane, 1,1 - bis(4-hydroxyphenyl) isopentane, 2,2-bis(4-hydroxyphenyl) propane, 2,2 - bis(4-hydroxyphenyl) butane, 2,2 - bis(4-hydroxyphenyl) pentane, and 3,3-bis(4-hydroxyphenyl) pentane.

Various salts and suspending agents may be added to the pure detergents of this invention to augment their detergency. These are termed "builders" and are usually phosphates, silicates, sulfates, carboxymethyl cellulose, and a wide variety of other materials. Built formulations prepared from the products of the instant invention gave excellent high detergency-low foam results, as will be shown hereinafter. The following formulation was used to evaluate the detergency of these non-ionic detergents:

15% by weight non-ionic detergent
50% by weight sodium tripolyphosphate
33% by weight sodium sulfate
2% by weight carboxymethyl cellulose The built non-ionic detergents were tested in a standard Launderometer apparatus. The procedure and method of calculating detergency values differ in minor detail from that shown in "Carbon Soil Removal," P. T. Vitale et al., Soap and Chemical Specialties, vol. 32, No. 6, pp. 41–44 (June 1956), and are described below. The Launderometer consists of a spindle mechanism rotating in a hot water thermostated bath. Mason jars of 1 pint capacity containing detergent, water, soiled cloth, and balls for agitation are rotated on the spindle mechanism for a set time at a set rate in the hot water. The degree of cleaning is determined and the resulting numbers are the detergency values. These values are correlated with a standard anionic detergent having an arbitrarily assigned detergency value and a standard non-ionic detergent having an assigned detergency value based on the standard anionic detergent.

The detergency tests are conducted in the following manner:

The new cloth is washed with 2 weight percent of a commercial mild fatty acid soap to remove the sizing. It is put through 3 full rinse cycles in an automatic washer, hung to damp dry, cut into 4 inch wide strips, ironed and set in a desiccator in a temperature and humidity controlled room.

The strips of cloth are soiled with the following composition:

0.9 g. commercial hydrogenated vegetable oil (trademarked Crisco)
3.1 g. A. U. S. P. grade mineral white oil
1.0 g. lampblack
300 ml. carbon tetrachloride The hydrogenated vegetable oil, mineral white oil and lampblack are mixed with sufficient carbon tetrachloride to just dissolve the oil and fat. The concentrated soil slurry is then passed through a small, hand-operated homogenizer and the balance of the carbon tetrachloride added. About 200 ml. of soil is placed in a nine inch evaporating dish and a strip of the cloth is passed through this rapidly and smoothly three times. The cloth is hung to dry at room temperature for two hours±fifteen minutes, and is then cut into 2 inch by 4 inch swatches and read photometrically. The photometer is calibrated against a magnesia block with the standard equal to 100.

One pint Mason jars are washed and set in the Launderometer rack. They are each filled with 6 ml. of five percent by weight solution of the above mentioned built composition, 10 three-eighths inch diameter hard rubber balls, one soiled swatch, and enough 300 p. p. m. hardness water to make 100 ml. of solution. The final concentration of the built composition is 0.3 percent with the concentration of the active non-ionic detergent being 0.045 percent by weight. The jars are capped, set on the spindle mechanism, and rotated at 40–42 R. P. M. for 20 minutes at 120° F. The jars are immediately removed, the height of the foam above the detergent solution in each jar is immediately noted (following one quick inversion of each jar), and the swatches are dried on paper and photometer readings taken.

The detergency is calculated in the following way:

$$\text{Raw detergency} = L = \frac{R-S}{V-S} \times 100$$

where:
$R$=photometric percent reflectance of the washed cloth
$S$=photometric percent reflectance of the soiled cloth
$V$=photometric percent reflectance of the virgin cloth The L value is then related to a standard value by a factor to give the final detergency:

$$\text{Final detergency} = D = L \times \frac{S_t}{L_s}$$

where:
$S_t$=the arbitrary detergency of the standard
$L_s$=the L (raw detergency) value for the standard which is always run concurrently with the material being tested.

An arbitrary detergency ($S_t$) of 70 is assigned to a commonly used commercial anionic detergent which is employed as the standard. A non-ionic commercial detergent is used as a secondary standard and is assigned a detergency of 80 based on the assigned value of 70 for the standard anionic.

The detergency data obtained by testing various representative compounds of this invention in the examples which follow not only demonstrate the utility of the invention, but also demonstrate the superiority of these compounds over the standard anionic and non-ionic detergents available commercially.

EXAMPLE I

A mixture of 210 g. phenol, 30 g. acetone, and 21 g. concentrated HCl was heated at 40° C. for 24 hours. The reaction mixture was then poured into 300 ml. of 40 volume percent acetic acid. The resulting crystals of 2,2-bis(4-hydroxyphenyl) propane were separated by filtration and dried in a vacuum oven at 75° C. A portion of the crystals having an M. P. of 153° C. to 155° C. was mixed with 1 weight percent sodium hydroxide and 3 weight percent sodium glycerophosphate in a glass reaction flask. The mixture was heated to 250° C. to 260° C. and the addition of ethylene oxide through a sintered glass disc was begun. Samples were taken at each mole ratio of ethylene oxide to 2,2-bis(4-hydroxyphenyl) propane from 8:1 to 12:1 and each of these was compounded into the previously described 15 weight percent active non-ionic built detergent composition. Table I summarizes the detergencies and foam heights at 0.3 percent concentration, in 300 p. p. m. hardness water, of the built detergent compositions.

*Table I*

| Sample Number | Moles Ethylene Oxide per Mole of 2,2-bis (4-hydroxyphenyl) Propane | Detergency at 0.3% Concentration | Foam Height (Inches) |
|---|---|---|---|
| 1 | 8 | 78 | 0 |
| 2 | 9 | 77 | 0 |
| 3 | 10 | 81 | 0 |
| 4 | 11 | 82 | 0 |
| 5 | 12 | 82 | 0 |

These data show that the detergencies were as good or better than known commercial non-ionic detergents and in addition the foam was so low as to be negligible.

EXAMPLE II

A portion of 2,2-bis(4-hydroxyphenyl) propane, marketed as Bisphenol "A" by the Dow Chemical Company, was mixed with 2 weight percent potassium carbonate in a glass reaction flask. The mixture was heated to 160° C. to 170° C. and ethylene oxide was passed into the reaction flask through a sintered glass disc.

Samples were taken at mole ratios of ethylene oxide to 2,2-bis(4-hydroxyphenyl) propane of 13:1 and 14:1 and each of these was compounded into the previously described 15 weight percent active non-ionic built detergent composition.

Another portion of the same Bisphenol "A" was mixed with 2 weight percent potassium carbonate in a glass reaction flask. The mixture was heated to 225° C. to 235° C. and ethylene oxide was passed into the reaction flask through a sintered glass disc. Samples were taken at mole ratios of ethylene oxide to 2,2-bis(4-hydroxyphenol) propane of 13:1 and 14:1 and each of these was compounded into the 15 weight percent active non-ionic built detergent composition heretofore described.

The built detergents made from each portion of Bisphenol "A" were tested for detergency at 0.3 percent concentrations, in 300 p. p. m. hardness water, of the built detergent compositions as previously described. The results are set forth in Table II below:

Table II

| Reaction Temperature | Moles Ethylene Oxide to Moles Bisphenol "A" | Detergency at 0.3% Concentration |
|---|---|---|
| 160° C.–170° C. | 13 | 65 |
|  | 14 | 57 |
| 225° C.–235° C. | 13 | 84 |
|  | 14 | 84 |

These data show clearly the superiority of the nonionic detergents prepared at high temperatures over those prepared at low temperatures.

We claim:
1. The process for the production of synthetic nonionic detergents which comprises heating 2,2-bis(4-hydroxyphenyl) propane and an alkaline catalyst to from 210° C. to 270° C. and introducing ethylene oxide in an amount such that the mole ratio of ethylene oxide to said 2,2-bis(4-hydroxyphenyl) propane is from about 10:1 to 15:1.
2. The products obtained by the process according to claim 1.
3. The process for the production of synthetic nonionic detergents which comprises heating 2,2-bis(4-hydroxyphenyl) propane and an alkaline catalyst to from 225° C. to 260° C. and introducing ethylene oxide in an amount such that the mole ratio of ethylene oxide to said 2,2-bis(4-hydroxyphenyl) propane is from about 10:1 to 15:1.

References Cited in the file of this patent
UNITED STATES PATENTS

| 2,440,093 | Israel | Apr. 20, 1948 |
| 2,504,064 | Bock et al. | Apr. 11, 1950 |
| 2,778,854 | Stoltz | Jan. 22, 1957 |

OTHER REFERENCES

Schwartz et al.: Surface Active Agents (1949), pp. 18, 19.

Chem. and Eng. News, vol. 33 (1955), p. 2999.